United States Patent [19]

Simons et al.

[11] 3,764,999

[45] Oct. 9, 1973

[54] SHARED MEMORY CIRCUIT

[75] Inventors: Brent S. Simons; Howard L. Nurse, both of Palo Alto, Calif.

[73] Assignee: Itek Corporation, Lexington, Mass.

[22] Filed: Aug. 21, 1972

[21] Appl. No.: 282,648

[52] U.S. Cl. .......................... 340/172.5, 343/18 E

[51] Int. Cl. .......................... G06f 9/18

[58] Field of Search .......................... 343/18 E; 340/172.5

[56] References Cited

UNITED STATES PATENTS

| | | | |
|---|---|---|---|
| 3,604,828 | 9/1971 | Perkovich | 343/18 E |
| 3,670,333 | 6/1972 | Winn | 343/18 E |
| 3,094,609 | 6/1963 | Weiss | 340/172.5 |
| 3,324,458 | 6/1967 | MacArthur | 340/172.5 |

*Primary Examiner*—Gareth D. Shaw
*Attorney*—Homer O. Blair et al.

[57] ABSTRACT

A circuit for allowing one microwave oscillator to be time shared between multiple incoming radar pulse trains for electronic countermeasure jamming purposes. Each pulse train is composed of pulses of radio frequency energy at a particular carrier frequency which is generally different from the carrier frequencies of other pulse trains. The circuit allows the microwave oscillator to be time shared on a pulse by pulse basis between all of the incoming radar pulse trains. When an individual pulse train first enters the circuit, the circuit searches for the carrier frequency of the pulse train, and after lock-on digitally memorizes the carrier frequency for use in jamming as succeeding pulses are received in that pulse train. As each pulse in the pulse train is received, the circuit compares the frequency in memory with the carrier frequency of the received pulse. During the search period the circuit first goes through a coarse tune search sequence and then a fine tune search sequence. During the coarse tune search sequence the two frequencies are compared and if the two frequencies are greater than 10 megahertz (MHZ) apart, the circuit adds 10 MHZ to the frequency in memory. In this manner, the frequency stored in memory is stepped by 10 MHZ with each succeeding pulse until the frequency in memory comes to within 10 MHZ of a currently received pulse in the pulse train. At that point, the circuit enters a fine tune search sequence, and steps the frequency in memory by one MHZ increments until the frequency in memory is within one MHZ of a currently received pulse in that pulse train. Upon receipt of succeeding pulses in the pulse train the correctly memorized carrier frequency drives the microwave oscillator, the output of which is utilized for electronic countermeasure jamming purposes. If the carrier frequency of a pulse train is slewing, the circuit has the ability to track the slewed frequency without going into a search mode provided the slew rate is less than ± 10 MHZ per pulse.

24 Claims, 4 Drawing Figures

COARSE TUNE CIRCUIT

FIG. 1. COARSE TUNE CIRCUIT

PATENTED OCT 9 1973 3,764,999

SHEET 2 OF 3

DISCRIMINATOR BANDPASS CHARACTERISTICS

SHARED MEMORY CIRCUIT

BACKGROUND OF THE INVENTION

The present invention relates generally to an electronic countermeasure circuit which is utilized in radar jamming, and more particularly pertains to a new and improved circuit which allows one microwave oscillator to be time shared for jamming purposes between multiple incoming radar pulse trains on a pulse by pulse basis.

In the field of electronic countermeasure jamming circuits, it has been the general practice to receive an enemy radar pulse, amplify it, and then retransmit it back to the enemy for jamming purposes. A problem with this approach is that the necessary circuitry introduces a time delay between the receipt and retransmission of the pulse. This time delay does now allow the radar jamming equipment to be as effective as it might be otherwise.

Circuits have been developed to sort individual pulse trains from a composite signal of many pulse trains, and also to generate a gating signal for each anticipated pulse in each sorted pulse train. The generation of the gating signal allows the jamming equipment to anticipate the receipt of the next pulse in each pulse train, and also to broadcast a jamming pulse at the anticipated time of receipt without a time delay. Reference should be made to U.S. Pat. application No. 172,339 for PULSE TRAIN SORTER, filed Aug. 11, 1971 for more details on such a circuit.

Generally, each sorted pulse train will have a different carrier frequency. One obvious approach to jamming the plurality of pulse trains would be to have a plurality of YIG tuned oscillators, and to allocate one YIG oscillator for each received pulse train. The present invention offers a more practical approach to jamming by utilizing one microwave oscillator, and time sharing that oscillator on a pulse by pulse basis between all of the incoming pulse trains.

SUMMARY OF THE INVENTION

In accordance with a preferred embodiment, a system is disclosed for storing in a memory a plurality of values corresponding to a plurality of analog signals, and for time sharing an output between the plurality of stored values. The system time shares the output between the stored values on an analog signal by analog signal basis as each signal is received. Further, the system undates the values stored in memory to correspond with currently received analog signals. A currently received analog signal is compared with the stored value, and the stored value is changed if the comparison indicates that the two values are not within a given range of each other.

Further, the preferred embodiment provides such a system wherein the values are stored in a digital memory, and a digital to analog converter is utilized to convert stored digital values to corresponding analog values. Also, the preferred embodiment provides such a system wherein the stored value is updated by incrementally changing the stored digital word each time the comparison indicates that the analog value corresponding to the stored digital word is not within a given range of a received analog signal. Further, the preferred embodiment provides a system wherein the digital word in memory is updated by first a coarse tune search iteration and secondly by a fine tune search iteration. Also, the preferred embodiment provides a system which is particularly adapted to be utilized with a plurality of radar pulse trains, and wherein the information stored in memory corresponds to the carrier frequency of each pulse train, and further wherein the output includes a variable frequency oscillator which is time shared between the plurality of radar pulse trains on a pulse by pulse basis. Also, the preferred embodiment provides a priority encoder for assigning priorities to the plurality of pulse trains, and for directing the system to process the highest priority pulse train first if pulses of radio frequency energy are simultaneously received from several pulse trains.

Although the preferred embodiment illustrates a circuit which was developed to allow one oscillator to be time shared between multiple incoming radar pulse trains, it should be realized that the circuit techniques taught by this invention are not restricted to that application, and can be utilized wherever it is desired to accurately sample and store many analog signals. The number of analog signals which may be stored and the time allocated for an output for each signal would depend upon each application. Also, the size of the search increments may be varied from embodiment to embodiment, and would also depend upon each application.

DESCRIPTION OF A PREFERRED EMBODIMENT

The present invention is a multiplexed programmable oscillator, and was developed to allow one microwave oscillator to be time shared between multiple pulse trains on multiple electronic channels. Each pulse train consists of a series of pulses at a given pulse repetition frequency with each pulse having radio frequency energy at a given carrier frequency. Each electronic channel has a number of signals associated with it, among which are a pulse train in that channel and a gating signal for each pulse in the pulse train. Reference should be made to U.S. Pat. application No. 172,339 for PULSE TRAIN SORTER, filed Aug. 11, 1971, for a more complete understanding of the input signals to the present invention. The PULSE TRAIN SORTER separates individual pulse trains from a composite signal such that each individual pulse train is separated into a separate electronic channel, and the SORTER also generates a gating signal for each pulse in each pulse train.

The multiplexed programmable oscillator has as input signals the gating signals for each pulse train in each of the plurality of electronic channels. The circuit time shares one microwave oscillator on a pulse by pulse basis between all of the pulse trains present in all of the channels. As each pulse train first enters the circuit, the circuit rapidly tunes the oscillator to the carrier frequency of that pulse train, and then digitally memorizes the carrier frequency. If pulse trains are present on more than one channel, the present invention switches between channels as individual pulses are received in each channel, and time shares the oscillator between all incoming pulse trains on a pulse by pulse basis.

Figure 1:
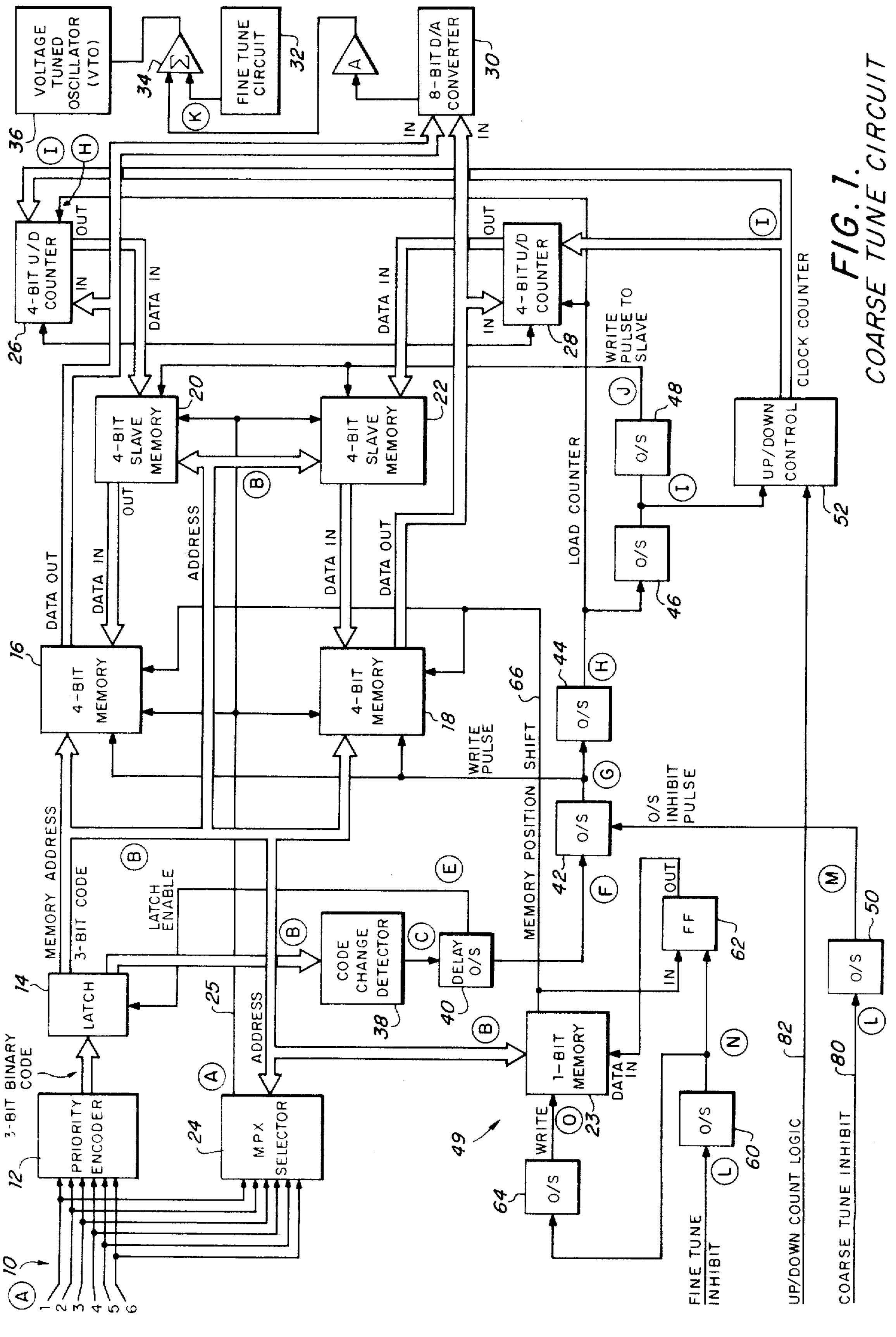
FIG. 1 illustrates the course tune circuit of the multiplexed programmable oscillator.

FIG. 1 illustrates the coarse tune circuit of the multiplexed programmable oscillator. The oscillator also includes a fine tune circuit, shown as block 32, which is substantially the same as the coarse tune circuit, and which has not been illustrated in detail to avoid repetition.

The circuit receives gating signals for each of pulse trains 1–6 on respectively each of lines 1–6, shown at 10. In the preferred embodiment each gating signal consists of a 10 microsecond wide gating pulse. The gating signals on lines 1–6 are directed to a priority encoder 12 which produces a digital code signal for each channel as a gating signal is received over each channel. Priority encoder 12 produces a three bit digital one (0, 0, 1) each time gating signal is received on line 1, a three bit digital two (0, 1, 0) each time a gating signal is received on line 2, and etc. for each of lines 3 through 6. Priority encoder 12 also assigns priorities to the channels as particular pulse trains in particular channels have a higher priority, in terms of being processed first, than other pulse trains. In the preferred embodiment channel 1 has the highest priority, channel 2 the second highest priority, etc. Each time a gating signal is received on one of lines 1–6, the priority encoder produces at its output the code for the addressed channel unless another channel having a higher priority is also simultaneously receiving a gating signal, or unless a lower priority channel has received a gating signal and the circuit is in the process of "writing" as described below. The priority code is directed through latch 14, the function of which will be explained later, to memories 16 and 18, slave memories 20 and 22 and a one bit memory 26. Memories 16 and 18 are four bit memories, and are wired together to form one eight bit memory. Likewise, slave memories 20 and 22 are wired together to form one eight bit slave memory. For all practical purposes memories 16 and 18 may be considered to be one eight bit memeory, and memories 20 and 22 may be considered to be one eight bit memory. Memories 16 and 18 have two major memory segments with each major memory segment having the capability of storing at least six eight bit words. The function of the memory segments in memories 16 and 18 will be explained later. Slave memories 20 and 22 have the capability of storing at least six eight bit words. The coarse tune circuit also includes four bit up-down counters 26 and 28. Four bit up-down counters 26 and 28 are wired together like the memories to form one eight bit up-down counter, and for all practical purposes may be considered as one eight bit counter.

The coarse tune circuit further includes a digital to analog converter 30 which converts an eight bit digital word read out of the coarse tune memory into a corresponding analog voltage level. That analog voltage is summed with an analog voltage from the fine tune circuit 32 in a summing amplifier 34, and the summed voltage is utilized to control the frequency of a voltage tuned oscillator (VTO) 36. The coarse tune circuit also includes a series of timing circuits which will be explained in detail later and which include a code change detector 38, a delay one shot multivibrator 40, hereinafter called a one shot, a write signal one shot 42, a load counter signal one shot 44, a count data signal one shot 46, and a write signal one shot 48. The circuit further includes a section 49 which causes the coarse tune circuit to switch back and forth between the two major memory segments, mentioned previously, after the multiplexed programmable oscillator has locked onto a particular pulse train.

It is believed that the easist way to explain this circuit from this point on is to follow the circuit through an operating cycle, which will now be done. While following the operation of the circuit of FIG. 1, reference should also be made to the timing diagrams illustrated in FIG. 2. In the following example, it will be assumed that memories 16 and 18, and memories 20 and 22 are operating in their first major memory segments. Assume further in this example that the circuit has only one pulse train as an input on channel 2. Assume further that the carrier frequency in each pulse of that pulse train is at 92 megahertz (MHZ), and that an eight bit digital word is stored in the channel 2 section of memories 16 and 18 which word, when converted to an analog voltage by D/A converter 30, would cause VTO 36 to oscillate at 60 MHZ. Assume also that the channel 2 section of the memory in the fine tune circuit 22 contains a digital zero such that the voltge out of the fine tune circuit is zero.

Figure 2:
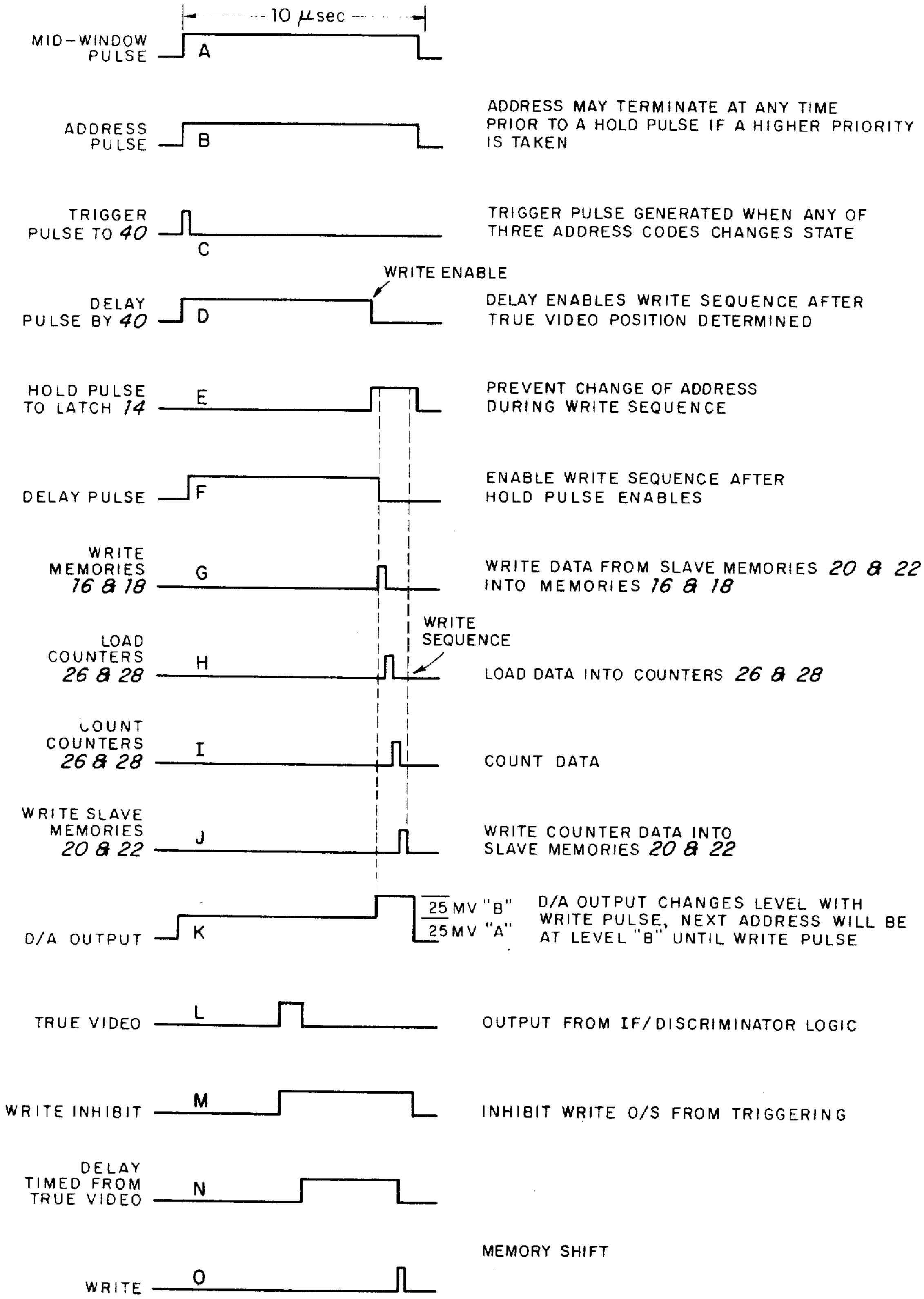
FIG. 2 shows waveforms which are usedful in explaning the operation of the embodiment illustrated in FIG. 1.

The first ten microsecond gating signal in the pulse train, illustrated as waveform A in FIG. 2, is received on line 2 by priority encoder 12 which puts out a three bit code (010) corresponding to a digital two. This code indicates that a gating signal is present on channel 2. This code is directed through latch 14 to memories 16 and 18, 20 and 22, a multiplex selector 24, and a one-bit memory 23. Waveform B of FIG. 2 illustrates one bit of the three bit binary code produced by priority encoder 12. The three bit code directs multiplex selector 24, which is basically a six position switching circuit, to channel 2 and the ten microsecond gating pulse on line 2 is passed by multiplex selector 24 onto line 25 where it is directed to memories 16, 18, 20 and 22. This signal on line 25 functions to enable each of memories 16, 18, 20 and 22 to be addressed. The presence of a signal on line 25 is required in order to address the memories which are normally "off" during periods of time when there are no gating signals present at input 10.

The enabling signal on line 25 allows the code signal from priority encoder 12 to address the channel 2 memory section in each of memories 16, 18, 20 and 22, and causes the channel 2 memory sections of memories 16 and 18 to write out the eight bit word stored therein. This eight bit word is read into D/A converter 30 which produces an analog voltage proportional to the eight bit word read in. This analog voltage from the coarse tune circuit is the summed in summing amplifier 34 with another analog voltage from fine tune circuit 32. In this example it is assumed that this voltage from the fine tune circuit is initially zero. Also, it is assumed that the eight bit word initially stored in the channel 2 section of memories 16 and 18, when converted to an analog voltage by D/A converter 30, would cause VTO 36 to oscillate at 60 megahertz. The frequency of this 60 MHZ signal is then compared with the carrier frequency of the incoming radar signal, assumed to be 92 MHZ, in the circuit of FIG. 3 in a manner to be explained later. That frequency comparison indicates that the two frequencies are greater than 10 MHZ apart.

While the series of operations described in the previous paragraph are being carried out, other operations are being performed by the circuit. The complement of the three bit address code produced by priority encoder 12 is directed to a code change detector circuit 38 which detects a change of code and produces a trigger pulse C, illustrated in FIG. 2. Code change detector circuit 38 operates on the complement of the code because of the manner in which the polarities were set up in the designed embodiment. Trigger pulse C is directed to circuit 40, which in actuality includes several one shot multivibrators, and which develops delay pulses D and F, illustrated in FIG. 2. These delays are introduced to allow time for: memories 16 and 18 to write out an eight bit word to D/A converter 30; D/A converter 30 to respond to the word and produce a corresponding analog voltage; VTO 36 to respond to that voltage; and the frequency of VTO 36 to be compared with the frequency of the incoming radar signal. All of these operations occur during delay pulses D and F. After the frequency comparison has been completed, the circuit makes a decision as to whether the two signals are within 10 MHZ, in which case the coarse tune search will be terminated and the fine tune search activated, or whether the two signals are greater than 10 MHZ apart, in which case the coarse tune circuit will proceed through another search iteration upon the receipt of the next gating signal on line 2. If the two signals are within 10 MHZ the frequency comparison circuit of FIG. 3 generates a true video signal on line 80 which causes one shot circuit 50 to generate an inhibit pulse M, illustrated in FIG. 2, for one shot 42 which would prevent another search iteration from being carried out. In our example, the frequencies of the two signals are 32 MHZ apart and accordingly an inhibit signal is not produced by one shot 50 which allows one shot 42 to develop write pulse G, illustrated in FIG. 2, at the end of delay pulse F.

As pulse G is developed another operation is also taking place. Since the coarse tune circuit is proceeding through another search iteration, a number of "write" operations will soon occur. It would be undesirable to have the circuit switch to a higher priority channel if a higher priority signal were received, for instance on higher priority channel 1, while these "write" operations were occuring. Accordingly, circuit 40 includes a one shot which generates waveform E, at the termination of delay pulse D, while the coarse tune circuit is "writing" to prevent latch 14 from passing a new address signal during "writing".

The write pulse G produced by one shot 42 is directed to memories 16 and 18, and directs those memories to write in the eight bit word from the addressed channel 2 sections of slave memories 20 and 22. Waveform G also triggers one shot circuit 44 which produces pulse H, illustrated in FIG. 2, which is directed to counters 26 and 28, and directs those counters to load in the eight bit word stored in memories 16 and 18. Pulse H also triggers one shot 46 which generates pulse I, illustrated in FIG. 2, which directs counters 26 and 28 to add a digital one to the eight bit word just loaded in from memories 16 and 18. Pulse I also triggers one shot 48 which produces pulse J which instructs slave memories 20 and 22 to write the eight bit word presently in counters 26 and 28 into the addressed channel 2 section of slave memories 20 and 22.

All of the aforementioned operations combined have functioned to add a digital one to the eight bit word stored in the channel 2 section of memories 16 and 18. In this manner when the second gating signal appears on line 2, the eight bit word read out of the channel 2 section of memories 16 and 18 will be one digit higher than the word read out for the first pulse, which will in turn cause D/A converter 30 to produce a higher analog voltage which will step VTO 34 by an increment of 10 megahertz. A frequency comparison by the circuit of FIG. 3 will indicate that the frequencies of the two signals are greater than 10 MHZ apart, and in a manner as explained above, the coarse tune circuit will add a digital one to the word stored in memories 16 and 18. In a similar manner the frequency comparison initiated by the third grating signal on line 2 will indicate that the frequency of VTO 36 is still greater than 10 MHZ from the radar signal, and the comparison initiated by the fourth gating signal will indicate that the frequency of VTO 36 is <10 MHZ but >1 MHZ from the frequency of the incoming radar signal. At that point a frequency comparison by the circuit of FIG. 3 will cause the discriminator logic circuit of FIG. 3 to product a true video pulse L, shown in FIG. 2, on line 80, which indicates that the oscillator is now tuned to within 10 MHZ of the incoming radar signal. Pulse M inhibits one shot 42 which prevents the coarse tune circuit from adding a digital one to the word stored in memories 16 and 18. In this manner, the circuit of FIG. 1 will read out that same digital word for each new gating signal received on line 2.

Figure 3:
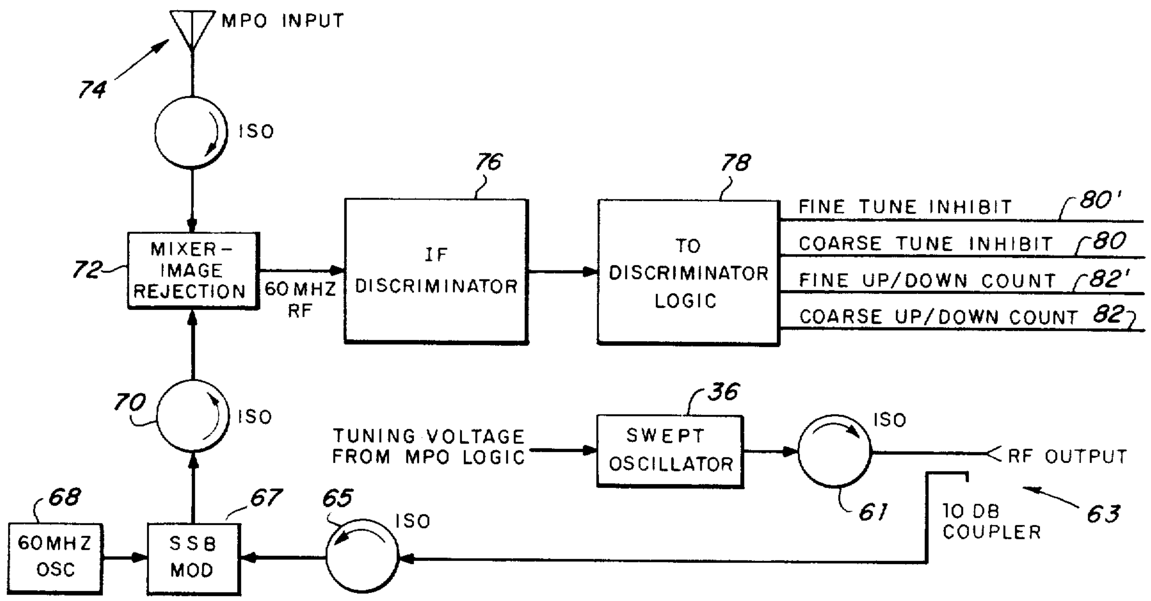
FIG. 3 illustrates a frequency comparator circuit which may be used with the circuit of FIG. 1.

When the discriminator logic circuit of FIG. 3 disables the coarse tune circuit, the fine tune circuit 32 is simultaneously enabled. The fine tune circuit is substantially the same as the coarse tune circuit of FIG. 1 and is not shown in detail to avoid repetition. The fine tune circuit is enabled and disabled in the same manner as the coarse tune circuit, and is designed to tune the oscillator to within 1 MHZ of the radar signal while utilizing 1 MHZ iterations. Since the fine tune circuit has to make at most nine iterations to tune the VTO to within 1 MHZ of the radar signal, a four bit memory having a capacity of 16 separate words is sufficient for the fine tune circuit instead of the eight bit memory required by the coarse tune circuit.

In the following discussion of the fine tune circuit, the circuit of FIG. 1 will be referred to as illustrative of the fine tune circuit since the circuit arrangement is identical. However, each reference to an element in the fine tune circuit will be indicated by the superscript ('). Resuming the example, during the frequency comparison carried out upon receipt of the fourth gating pulse, the frequency of the VTO is 2 MHZ less than the frequency of the radar signal. Accordingly, the fine tune circuit will be enabled by a signal low to one shot 50'. Also, during the search iteration of the fine tune circuit, the fine tune circuit counts ether up or down to tune the fine tune circuit, unlike the coarse tune circuit which only counts up during its search iterations. Both the fine and coarse tune circuits have the capability of counting either up or down which is introduced by up/-down count control circuit 52. As will be explained later, the coarse tune circuit also utilizes this capability in a later operation. The discriminator logic circuit of FIG. 3 produces either a high or low signal on line 82' giving up/down control circuit 52' the command to count respectively down or up. In the example, the fine tune circuit will go through one iteration on the next gating pulse before it tunes the VTO to within 1 MHZ of the radar signal. At that time, the frequency comparison circuit would inhibit further searching by the fine tune circuit. Assuming that the carrier frequency of the received radar pulses in the pulse train does not change for succeeding pulses in the pulse train, VTO 36 would be tuned to within 1 MHZ of the carrier frequency, and the output of the VTO could be used for radar countermeasure jamming purposes.

It was previously mentioned that memories 16 and 18 each have two major memory segments. The purpose of the two major memory segments will now be explained. Many enemy radar installations have the ability to send out two pulse trains with each of the two pulse trains having the same pulse repetition frequency, but with each pulse train having a different carrier frequency. Each of the signals on channels 1–6 is sorted on the basis of pulse repetition frequency. Accordingly, it is possible for each of channels 1–6 to have two separate pulse trains with each pulse train having the same pulse repetition frequency but a different carrier frequency. In such a situation every other pulse in that electronic channel would have a different carrier frequency, and the multiplexed programmable oscillator would be locked to the lowest RF signal and miss the second frequency. Accordingly, memories 16 and 18 were provided with two major memories segments to enable the programmable oscillator to switch back and forth between the two major memory segments with each pulse such that each pulse train is served by one major memory segment.

When the circuit is locked onto a pulse train to within 1 MHZ, as described in the example above, further searching in the fine tune section is inhibited by a fine tune inhibit signal which is also directed to circuit 49 of FIG. 1 where it triggers one shot 60 which produces a delay signal N, illustrated in FIG. 2. This delay signal is directed to a flip-flop 62 and a one shot circuit 64. The delay signal N causes flip-flop 62 to immediately change its state and causes one shot circuit 64 to produce a write signal 0, illustrated in FIG. 2, at the end of the delay pulse. If the flip-flop were in a zero state previous to the pulse from one shot 62, it would flip over to a one state and vice versa. The write pulse from one shot 64 then causes one bit memory 23 to write in the changed state of the flip-flop. In this manner, the one bit of one bit memory 23 is caused to alternate between a zero and one state each time lock-on is indicated by a fine tune inhibit signal from the frequency discriminator logic. One bit memory 23 has the capability of storing at least six one bit words, one for each channel. Memory 23 is addressed by the address code from priority encoder 12, and according in the example is currently addressing the channel 2, 1 bit word memory section. The output of one bit memory 23 is a memory position shift signal on line 66 which is the most significant bit of the memory address to memories 16 and 18. This shift of the most significant bit in the four bit memory address (the other three bits coming from priority encoder 12) gives access to the second major segment of memory within memories 16 and 18. The next input pulse in the locked-on channel (in the example, channel 2) will read out the 8 bit word stored in this second major segment of memory, which will be different from the word stored in the first major memory segment at lock-on. Thus, the circuit will go through a second coarse and fine tune iteration until lock-on is achieved in the second major memory segment. In the second coarse tune iteration the memories and counters would continue to count the same as before, except that the counting would start from the count corresponding to the first locked RF signal pulse 10 MHZ. As the count increases, a higher RF signal may be found. If so, its frequency will be stored in the second segment of the memory the same as the first locked-on frequency was stored in the first segment of memory. In the event that no higher frequency signal is found, the counter would reach a maximum count, reset to zero, and start over. This would cause the first RF signal to be reacquired, and it frequency stored in the second memory segment as well as in the first memory segment. The multiplexed programmable oscillator memory will always alternate between its two major memory segments when locked, thereby working each signal on a 50 percent basis. If only a single RF signal is found on a particular electronic channel, it will be locked in both major sections of the memory. In the example, the oscillator will continue to alternate between memory segments but as frequency information in both memory segments corresponds to the same RF signal on channel 2, the signal will be worked on a 100 percent basis.

The multiplexed programmable oscillator has one further capability which will now be described. The oscillator has the ability to track a frequency that is slewing providing the slew rate is less than ± 10 MHZ per pulse. As described earlier the fine tune section has the ability to slew the oscillator either up or down in 1 MHZ increments. In the event the frequency of the incoming signal is slewing, the fine tune circuit will receive logic signals from the discriminator over line 82' and will be directed to count up or down by up-down count control circuit 52' to maintain signal tracking. However, since the fine tune circuit can only maintain tracking to within ± 10 MHZ, it would soon be driven to an end limit and lose lock unless a coarse tune slew were provided. The coarse tune circuit is provided with such a capability as follows. If the radar signal slews up 10 MHZ, then the coarse tune circuit will resume its normal search mode, step the word in memory by 10 MHZ, and will reacquire a coarse tune lock-on. The frequency discriminator logic circuit of FIG. 3 is provided with logic to recognize a downward slew of 10 to 20 MHZ, in which case it produces a signal low on line 82 which directs counter control circuit 52 to step the word in memory down 10 MHZ to maintain signal tracking.

Figure 4:
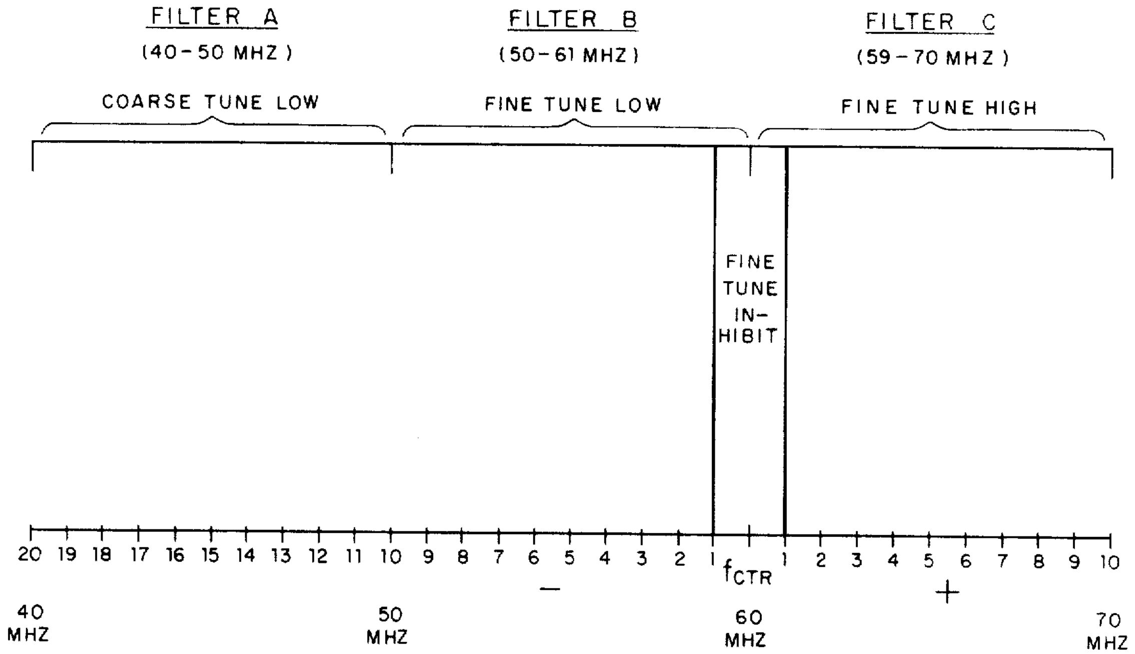
FIG. 4 shows the bandpass characteristics of filters in the IF discriminator illustrated in FIG. 3.

The operation of the frequency comparator circuit of FIG. 3 will now be explained. The output of the voltage tuned oscillator 34 is fed through microwave isolator 61 to a 10 DB coupler 63. The output of coupler 63 is then fed through isolator 65 to a single side band modulator circuit 67 wherein the signal from $VTO_{36}$ is mixed with a 60 MHZ signal from oscillator 68. The oscillator signal is mixed with a 60 MHZ signal as it is easier to measure frequency differences while using an intermediate frequency (IF) signal than while using the oscillator signal directly. The mixed signal from circuit 67 is then directed through isolator 70 to an image rejection mixer 72 wherein the signal is mixed with the incoming radar signal from an antenna 74. The resultant mixed signal is directed to IF discriminator circuit 76. IF discriminator 76 consists of three filter circuits connected in parallel. The bandpass characteristics of the filter circuits are indicated in FIG. 4. Filter circuit A has a bandpass of 40 to 50 megahertz, filter circuit B has a bandpass of 50 to 62 megahertz, and filter circuit C has a bandpass of 59 to 70 megahertz. Each of these filter circuits produces an output signal if the resultant mixed signal is in its bandpass region. The outputs of the three filter circuits are fed to discriminator logic circuit 78 which issues search or inhibit command output signals in dependence upon the signals from filters, A, B and C. If none of filters A, B or C produces an output signal, a coarse tune inhibit signal is not produced by discriminator logic circuit 78, and the coarse tune circuit remains in a normal countup search mode. If a signal is received from only filter circuit A then the discriminator logic circuit directs s signal to up/down count control circuit 52 to slew the coarse tune circuit down 10 megahertz, as mentioned previously. If either of filters B or C produces an output signal, which indicates that the two signals are within 10 megahertz, then the discriminator logic circuit inhibits searching by the coarse tune circuit and enables searching by the fine tune circuit. The fine tune circuit is caused to slew its count up or down in dependence upon which of filters B or C is producing an output signal. If both filter circuits B and C produce output signals, this indicates that the IF signal is in the shaded area shown in FIG. 4. Accordingly, lock-on is indicated, and the discriminator logic circuit inhibits searching by both the coarse and the fine tune circuits.

In the preferred embodiments the voltage tuned oscillator may be tuned through a 2.5 gegahertz range in 256 10 MHZ increments. The maximum lock-up time will be the input pulse repetition interval (PRI) times 256. If the input PRI were 1 millisecond, the maximum lock-up time would then be 256 milliseconds, or approximately one-quarter of a second. In the preferred embodiment, the sample duration is 10 microseconds as determined by the gating signal which is an input to the system. After lock-on, the first 2 microseconds of this 10 is required for processing an oscillator slew time, leaving 8 microseconds during which the oscillator is within ± 1 MHZ of the desired frequency. During these 8 microseconds, the RF output of the oscillator may be modulated with a preprogrammed electronic countermeasures technique and fed to a microwave amplifier to increase the effective power output.

In the preferred embodiment, analog information in the form of frequency of an incoming radar RF is stored to an accuracy of ± 0.01 percent. In alternative embodiments the number of analog signals which may be stored is limited only by the amount of time the analog output is desired from each channel. With current technology, this time may be a minimum of one microsecond because of the restricted rate of the D/A converter. Therefore, the maximum sample rate is limited to 1,000,000 samples per second. Theoretically, the memory can store as many signals as desired, restricted only by the desired sample rate and memory size. In alternative embodiments, greater frequency coverage may be obtained by increasing the number of bits in memory, i.e., $2^9$ would equal approximately 5 gegahertz, $2^{10}$ would equal approximately 10 gegahertz. In alternative embodiments wider iteration steps, other than 10 megahertz, might be used reducing lock-up time considerably, providing wider IF and discriminator bandwidths may be tolerated.

While several embodiments have been described, the teachings of this invention will suggest many other embodiments to those skilled in the art.

We claim:

1. A system for storing a plurality of values corresponding to a plurality of signals and for time sharing an output means between the plurality of stored values, and comprising:

a. input means for receiving a plurality of signals;

b. memory means for storing a plurality of values for said plurality of signals with each stored value corresponding to one signal;

c. output means to be time shared between the plurality of stored values for the plurality of signals;

d. means for time sharing said output means between said plurality of stored values including means for reading a stored value from said memory means and applying a representation of it to said output means as the signal corresponding to that stored value is received by said input means;

d. means for updating the stored value for each signal to correspond with current values of that signal, including means for comparing the signal received by said input means with the stored value for that signal, and means for changing the stored value for that signal if said comparing means indicates that the stored value for that signal is not within a given range of the signal received by said input means.

2. A system as set forth in claim 1 wherein:

a. said memory means includes a digital memory means for storing a digital word for each signal; and b. the system includes a digital to analog converter means coupled to said memory means for converting a stored digital word read out of said memory to an analog value.

3. A system as set forth in claim 2 wherein said means for updating the stored value for each signal includes means for incrementally changing the digital word stored in said memory means for that signal each time said comparing means indicates the stored value for that signal is not within said given range of the signal received by said input means.

4. A system as set forth in claim 3 wherein the system includes a coarse tune section and a fine tune section and:

a. said memory means includes a coarse tune memory means for storing a coarse tune digital word for each signal, and a fine tune memory means for storing a fine tune digital word for each signal;

b. said digital to analog converter means includes a coarse tune digital to analog converter means for converting the coarse tune digital word read out of said coarse tune memory means to a coarse tune analog value, and a fine tune digital to analog converter means for converting the fine tune digital word read out of said fine tune memory means to a fine tune analog value;

c. the system includes a summing means for summing the fine tune analog value and the coarse tune analog value to achieve a combined analog value for each signal; and d. said means for updating includes means for first incrementally changing the coarse tune digital word for each signal until said comparing means indicates said combined analog value for that signal is within a given coarse tune range of the signal received by said input means, and means for secondly incrementally changing the fine tune digital word for each signal until said comparing means indicates said combined analog value for that signal is within a given fine tune range of the signal received by said input means.

5. A system as set forth in claim 4 wherein:

a. a said coarse tune digital to analog converter includes means for converting the coarse tune digital word to a coarse tune voltage, and said fine tune digital to analog converter includes means for converting the fine tune digital word to a fine tune voltage for each signal; and b. said summing means includes means for summing the fine tune voltage and the coarse tune voltage to achieve a combined voltage for each signal.

6. A system as set forth in claim 5 wherein:

a. said input means includes means for receiving a plurality of pulse trains of radio frequency energy;

b. said output means includes a variable-frequency voltage tuned oscillator reponsive to the combined voltage produced by said summing means and which is to be time shared between the plurality of pulse trains on a pulse by pulse basis, whereby each time a pulse of radio frequency energy is received from one of the plurality of pulse trains said oscillator is utilized to produce a substantially similar pulse of radio frequency energy;

c. said comparing means includes means for comparing the frequency of the pulse received by said input means with the frequency generated by said variable frequency oscillator for that pulse train.

7. A system as set forth in claim 6 and wherein the system includes a priority encoder means for assigning priorities to the plurality of pulse trains, and for directing the system to process the highest priority pulse train first if pulses of radio frequency energy are simultaneously received from several pulse trains.

8. A system as set forth in claim 1 wherein the system includes a coarse tune section and a fine tune section, and:

a. said memory means includes a coarse tune memory means for storing a coarse tune value for each signal, and a fine tune memory means for storing a fine tune value for each signal;

b. the system includes a summing means for summing the fine tune value and the coarse tune value to achieve a combined value for each signal; and c. said means for updating includes means for first incrementally changing the coarse tune value for each signal until said comparing means indicates said combined value for that signal is within a given coarse tune range of the signal received by said input means, and means for secondly incrementally changing the fine tune value for each signal until said comparing means indicates said combined value for that signal is within a given fine tune range of the signal received by said input means.

9. A system as set forth in claim 8 wherein:

a. said input means includes means for receiving a plurality of pulse trains of radio frequency energy;

b. said output means includes a variable-frequency oscillator responsive to the combined value produced by said summing means and which is to be time shared between the plurality of pulse trains on a pulse by pulse basis, whereby each time a pulse of radio frequency energy is received from one of the plurality of pulse trains said oscillator is utilized to produce a substantially similar pulse of radio frequency energy; and c. said comparing means includes means for comparing the frequency of the pulse received by said input means with the frequency generated by said variable frequency oscillator for that pulse train.

10. A system as set forth in claim 9 and wherein:

a. said memory means includes a coarse tune digital memory means for storing a coarse tune digital word for each puls train, and a fine tune digital memory means for storing a fine tune digital word for each pulse train;

b. the system includes a coarse tune digital to analog converter means for converting the coarse tune digital word to a coarse tune voltage for each pulse train, and a fine tune digital to analog converter means for converting the fine tune digital word to a fine tune voltage for each pulse train;

c. the system includes a summing means for summing the fine tune voltage and the coarse tune voltage to produce a combined voltage for each pulse train; and d. the system includes an oscillator means, responsive to the combined voltage produced by said summing means for each pulse train, to produce a pulse of radio frequency energy.

11. A system for time sharing a variable frequency oscillator between a plurality of pulse trains, and comprising:

a. an input means for receiving a plurality of pulse trains of radio frequency energy;

b. a memory means for storing a plurality of values for said plurality of pulse trains with each stored value being associated with one pulse train and corresponding to a frequency in the system;

c. a variable frequency oscillator to be time shared on a pulse by pulse basis between said plurality of pulse trains, said variable frequency oscillator being responsive to input signals to produce a frequency corresponding to the value of each input signal;

d. means for time sharing said variable frequency oscillator between said plurality of pulse trains on a pulse by pulse basis as each pulse is received by said input means, including means for applying a signal to said variable frequency oscillator corresponding to the stored value in said memory means for each pulse train as a pulse in that pulse train is received by said input means; and e. means for updating the stored value for each pulse train to correspond with the frequency of currently received pulses in that pulse train, including means for comparing the carrier frequency of a pulse in that pulse train with the frequency produced by said variable frequency oscillator in response to the stored value for that pulse train, and means for changing the stored value for that pulse train if said comparing means indicates the frequency produced by said variable frequency oscillator in response to the stored value for that pulse train is not within a given range of the carrier frequency of a currently received pulse in that pulse train.

12. A system as set forth in claim 11 wherein said means for chaning the stored value includes means for incrementally changing the stored value by a given incremental step.

13. A system as set forth in claim 12 wherein:

a. said memory means includes a digital memory means for storing a digital word for each channel;
b. said variable frequency oscillator is a voltage controlled variable frequency oscillator; and
c. said means for applying a signal to said variable frequency oscillator includes a digital to analog converter means for converting a digital word read out of said memory means to a voltage, and said voltage controlled oscillator is responsive to the voltage produced by said digital to analog converter.

14. A system as set forth in claim 13 and including a coarse tune section and a fine tune section and wherein:
a. said memory means includes a coarse tune memory means for storing a coarse tune digital word for each pulse train, and a fine tune memory means for storing a fine tune digital word for each pulse train;
b. said digital to analog converter means includes a coarse tune digital to analog converter means for converting a coarse tune digital word to a coarse tune voltage, and a fine tune digital to analog converter means for converting a fine tune digital word to a fine tune voltage;
c. said means for applying a signal to said variable frequency oscillator includes a summing means for summing said coarse tune voltage and said fine tune voltage to achieve a combined voltage, and said voltage controlled oscillator is responsive to said combined voltage; and
d. said means for updating includes means for first incrementally changing the coarse tune digital word for each pulse train until said comparing means indicates the frequency produced by said voltage controlled oscillator is within a given coarse tune range of the frequency of a currently received pulse in that pulse train, and means for secondly incremetally changing the fine tune digital word for each pulse train until said comparing means indicates the frequency produced by said voltage controlled oscillator is within a given fine tune range of the frequency currently received pulse in that pulse train.

15. A system as set forth in claim 14 and including means for assigning priorities to the plurality of pulse trains and for directing the system to process the highest priority pulse train first if pulses of radio frequency energy of several pulse trains are simultaneously received by said input means.

16. A system as set forth in claim 15 wherein:
a. said memory means includes a first memory segment and a second memory segment with said first and second memory segments each including means for storing a coarse tune digital word and a fine tune digital word for each pulse train; and
b. means for alternately utilizing said first and second memory segments between alternate pulses of radio frequency energy received by said input means for each pulse train.

17. A system as set forth in claim 11 wherein:
a. said memory means includes a first memory segment and a second memory segment with said first and second memory segments each including means for storing a coarse tune digital word and a fine tune digital word for each pulse train; and
b. means for alternately utilizing said first and second memory segments between alternate pulses of radio frequency energy received by said input means for each pulse train.

18. A system as set forth in claim 17 wherein said means for changing the stored value includes means for incrementally changing the stored value by a given incremental step.

19. A system as set forth in claim 18 wherein:
a. said memory means includes a digital memory means for storing a digital word for each channel;
b. said variable frequency oscillator is a voltage controlled variable frequency oscillator; and
c. said means for applying a signal to said variable frequency oscillator includes a digital to analog converter means for converting a digital word read out of said memory means to a voltage, and said voltage controlled oscillator is responsive to the voltage produced by said digital to analog converter.

20. A system as set forth in claim 19 and including a coarse tune section and a fine tune section and wherein:
a. said memory means includes a coarse tune memory means for storing a coarse tune digital word for each pulse train, and a fine tune memory means for storing a fine tune digital word for each pulse train;
b. said digital to analog converter means includes a coarse tune digital to analog converter means for converting a coarse tune digital word to a coarse tune voltage, and a fine tune digital to analog converter means for converting a fine tune digital word to a fine tune voltage;
c. said means for applying a signal to said variable frequency oscillator includes a summing means for summing said coarse tune voltage and said fine tune voltage to achieve a combined voltage, and said voltage controlled oscillator is responsive to said combined voltage; and
d. said means for updating includes means for first incrementally changing the coarse tune digital word for each pulse train until said comparing means indicates the frequency produced by said voltage controlled oscillator is within a given coarse tune range of the frequency of a currently received pulse in that pulse train, and means for secondly incrementally changing the fine tune digital word for each pulse train until said comparing means indicates the frequency produced by said voltage controlled oscillator is within a given fine tune range of the frequency of a currently received pulse in that pulse train.

21. A system comprising:
a. memory means for storing a plurality of values with each value being indicative of a particular frequency in the system;
b. means for selectively reading a stored value out of said memory means;
c. means for comparing the frequency of an input signal into the system with the frequency indicated by the stored value read out of said memory means;
d. means, responsive to said comparing means when said comparing means indicates that the frequency of the input signal is not within a given incremental range of the frequency indicated by the stored value, for incrementally changing the stored value by a given incremental step within a given range of values, with the range of frequencies associated with said given range of values corresponding to the expected range of frequencies of input signals into the system, whereby the stored value will be incrementally changed until it is within said given incremental step of an input signal into the system.

22. A system as set forth in claim 21 wherein said memory means includes a digital memory means for storing a plurality of digital words, with each digital word being indicative of a particular frequency in the system.

23. A system as set forth in claim 22 and including:

a. a digital to analog converter means coupled to said memory means for converting a digital word read out of said memory means into a corresponding analog value; and b. means, responsive to the analog value produced by said digital to analog converter means, for producing the frequency indicated by that analog value.

24. A system as set forth in claim 23 wherein the system includes a coarse tune section and a fine tune section and wherein:

a. said memory means includes a coarse tune memory means for storing a plurality of coarse tune digital words, and a fine tune memory means for storing a plurality of fine tune digital words;

b. said digital to analog converter means includes a coarse tune digital to analog converter means for converting a coarse tune digital word to a coarse tune analog value, and a fine tune digital to analog converter means for converting a fine tune digital word to a fine tune analog value;

c. the system includes a summing means for summing the coarse tune analog value and the fine tune analog value to achieve a combined analog value;

d. said means for producing the frequency includes means responsive to said combined analog value for producing the frequency indicated by that combined analog value; and e. said means for incrementally changing the stored value includes means for first incrementally changing the coarse tune digital word until said comparing means indicates that the produced frequency is within a given coarse tune range of the frequency of an input signal, and means for secondly incrementally changing the fine tune digital word until said comparing means indicates the produced frequency is within a given fine tune range of the frequency of an input signal.

* * * * *